United States Patent
Pal et al.

(10) Patent No.: US 10,599,982 B2
(45) Date of Patent: Mar. 24, 2020

(54) INTERNET OF THINGS BASED DETERMINATION OF MACHINE RELIABILITY AND AUTOMATED MAINTAINENACE, REPAIR AND OPERATION (MRO) LOGS

(71) Applicants: Biplab Pal, Ellicott City, MD (US); Neeraj Nagi, Churu (IN); Amit Chakrabarty, Columbia, MD (US)

(72) Inventors: Biplab Pal, Ellicott City, MD (US); Neeraj Nagi, Churu (IN); Amit Chakrabarty, Columbia, MD (US)

(73) Assignee: MachineSense, LLC, Baltimore, MD (US)

( * ) Notice: Subject to any disclaimer, the term of this patent is extended or adjusted under 35 U.S.C. 154(b) by 406 days.

(21) Appl. No.: 14/696,402

(22) Filed: Apr. 25, 2015

(65) Prior Publication Data
US 2017/0011298 A1    Jan. 12, 2017

Related U.S. Application Data

(63) Continuation-in-part of application No. 14/628,322, filed on Feb. 23, 2015, now abandoned.

(51) Int. Cl.
G06N 5/04 (2006.01)
G06N 20/00 (2019.01)
(Continued)

(52) U.S. Cl.
CPC ........... *G06N 5/04* (2013.01); *G05B 23/0283* (2013.01); *G06N 20/00* (2019.01); *H04L 67/12* (2013.01); *H04L 41/147* (2013.01)

(58) Field of Classification Search
None
See application file for complete search history.

(56) References Cited

U.S. PATENT DOCUMENTS 4,023,940 A    5/1977   Shultz
4,131,011 A    12/1978  Ling
(Continued)

FOREIGN PATENT DOCUMENTS

CN    201672991       12/2010
CN    102539911 A     7/2012
(Continued)

OTHER PUBLICATIONS

Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).*
(Continued)

*Primary Examiner* — Kamran Afshar
*Assistant Examiner* — Benjamin J Buss
(74) *Attorney, Agent, or Firm* — Fox Rothschild LLP

(57) ABSTRACT

A computer implemented method and system for determining reliability of a machine includes receiving one of a machine data from one or more locations through an internet of things (IOT) based machine wearable sensor network. The method further includes storing the data in a distributed computer database communicatively coupled to an enterprise resource planning (ERP) system and extracting, through a computer server, one or more entity information from the data to compare against a pre-defined baseline. Further, mapping, though a big data machine learning engine, the extracted one or more entity information into a multi-classification model. The method includes indicating, through a machine learning engine coupled to a predictive analytics engine, on a user interface a set of analytical predictions for machine maintenance, repair and operation.

15 Claims, 14 Drawing Sheets

(51) Int. Cl.
  *G05B 23/02* (2006.01)
  *H04L 29/08* (2006.01)
  *H04L 12/24* (2006.01)

(56) References Cited

U.S. PATENT DOCUMENTS

| | | |
|---|---|---|
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,289,606 B2 | 9/2001 | Gillette et al. |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 10,041,844 B1 * | 8/2018 | Brady ............... G01K 17/06 |
| 2001/0038345 A1 | 11/2001 | Satoh et al. |
| 2002/0143421 A1 | 10/2002 | Wetzer |
| 2004/0102924 A1 * | 5/2004 | Jarrell ............... F01K 13/02 702/181 |
| 2004/0176926 A1 | 9/2004 | Edie |
| 2004/0199573 A1 | 10/2004 | Schwarz et al. |
| 2005/0222794 A1 | 10/2005 | Baird et al. |
| 2006/0137105 A1 | 6/2006 | Hong et al. |
| 2006/0168195 A1 | 7/2006 | Maturana |
| 2006/0208169 A1 | 9/2006 | Breed et al. |
| 2006/0276949 A1 | 12/2006 | Beck et al. |
| 2007/0088550 A1 * | 4/2007 | Filev ............... G05B 23/0221 704/245 |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 * | 5/2008 | Stoupis ............ G05B 23/0221 702/188 |
| 2008/0109185 A1 | 5/2008 | Cheung et al. |
| 2008/0188973 A1 * | 8/2008 | Filev ............... G05B 23/0221 700/110 |
| 2008/0289045 A1 | 11/2008 | Fryer |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 * | 1/2010 | Lee ................... G05B 23/0254 703/7 |
| 2010/0169030 A1 | 7/2010 | Parlos |
| 2010/0199352 A1 * | 8/2010 | Hill .................. G06F 21/577 726/25 |
| 2010/0295692 A1 | 11/2010 | Bjorn |
| 2011/0016199 A1 * | 1/2011 | De Carlo .......... H04W 4/005 709/220 |
| 2011/0035343 A1 * | 2/2011 | Bellamy ........... G06N 20/00 706/11 |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 * | 5/2014 | Gorbold ............. G01R 31/362 702/63 |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 * | 8/2014 | Goel ................. H04W 4/005 709/224 |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0160098 A1 * | 6/2015 | Noda ................ G05B 23/024 702/35 |
| 2015/0181313 A1 | 6/2015 | Murphy |
| 2015/0185251 A1 | 7/2015 | Heydron et al. |
| 2015/0233856 A1 | 8/2015 | Samuilov et al. |
| 2015/0261215 A1 | 9/2015 | Blevins |
| 2016/0086285 A1 | 3/2016 | Jordan Peters et al. |
| 2016/0147205 A1 * | 5/2016 | Kaufman ........... G05B 13/048 700/29 |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | | |
|---|---|---|---|
| CN | 103399486 A | 11/2013 | |
| CN | 203362223 U | 12/2013 | |
| CN | 203588054 U | 5/2014 | |
| CN | 104036614 A | 9/2014 | |
| EP | 1836576 B1 | 2/2012 | |
| EP | 2186613 B1 | 5/2013 | |
| EP | 2648393 A1 | 10/2013 | |
| WO | WO 2005/086760 A2 | 9/2005 | |
| WO | WO 2010/104735 A1 | 9/2010 | |
| WO | WO 2013/040855 A1 | 3/2013 | |
| WO | WO-2013041440 A1 * | 3/2013 | ......... G05B 23/0248 |
| WO | WO 2013/093942 A2 | 6/2013 | |
| WO | WO 2014/044906 A1 | 3/2014 | |
| WO | WO 2014/085648 A1 | 6/2014 | |
| WO | WO 2014/089567 A2 | 6/2014 | |
| WO | WO 2014/117245 A1 | 8/2014 | |

(56) References Cited

FOREIGN PATENT DOCUMENTS

| WO | WO 2015/022036 A1 | 2/2015 |
|---|---|---|
| WO | WO 2017/1234525 A1 | 7/2017 |

OTHER PUBLICATIONS

Höller, J. et al. (2014). "From Machine-to-machine to the Internet of Things: Introduction to a New Age of Intelligence." Chapters 2,4,5,7,10,12. Academic Press. DOI:10.1016/B978-0-12-407684-6.00002-4 (Year: 2014).*
International Search Report and Written Opinion for PCT Application No. PCT/US16/18820; dated Aug. 4, 2016.
International Search Report and Written Opinion for PCT Application No. PCT/US15/066547; dated Mar. 17, 2016.
Sensors Drive Mobile IoT; Wong, William; Jan. 26, 2015; Electronic Design.
International Search Report and Written Opinion for PCT Application No. PCT/US16/028724; dated Aug. 22, 2016.
International Search Report and Written Opinion for PCT Application No. PCT/US16/18831; dated Aug. 12, 2016.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Precursor Wear Debris in Lubrication Systems by Jack Edmonds, et al., dated May 2000, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Fault Diagnosis Method Study in Roller Bearing Based on Wavelet Transform and Stacked Auto-encoder, by Junbo Tan, et al., dated Feb. 2015, published by IEEE.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.
Dec. 21, 2018 Non-Final Office Action against Applicant's co-pending U.S. Appl. No. 14/833,111.

* cited by examiner

View Maintenance, Repair and Operations Data

Zone: Zone-1 ▶   Model / Machine: Silencer Pump ▶   Machine ID: All ▶

Process: All ▶   Date Range: 3-months ▶

Maintenance and Operations Data:

| Model | Position | Data Occurrence | Issues | Preventive Action | Days to Red | Link to Historical Data |
|---|---|---|---|---|---|---|
| Silencer (New) | Zone-2:Pump No-2 | 23-Sep-2014 04:25:43 | Abusive Operation | Decrease Pressure | NA | History |
| Silencer (New) | Zone-2:Pump No-1 | 10-Oct-2014 04:25:43 | Underfilled | Check oil leak | 23 | History |
| Silencer (New) | Zone-2:Pump No-1 | 15-Oct-2014 06:25:43 | Bad Oil | Change Oil | Red | History |
| Silencer (New) | Zone-2:Pump No-1 | 17-Oct-2014 06:25:43 | Underfilled | Check oil leak | 23 | History |
| Silencer (New) | Zone-2:Pump No-1 | 23-Oct-2014 06:25:43 | Abusive Operation | Decrease Pressure | NA | History |
| Silencer (New) | Zone-2:Pump No-1 | 23-Oct-2014 04:25:43 | Abusive Operation | Decrease Pressure | NA | History |
| Silencer (New) | Zone-2:Pump No-1 | 09-Nov-2014 06:25:43 | Filter Clogging | Change filter | N/A | History |
| Silencer (New) | Zone-2:Pump No-1 | 12-Nov-2014 04:25:12 | Underfilled | Check oil leak | 22 | History |
| Silencer (New) | Zone-1:Pump No-4 | 15-Nov-2014 06:25:43 | Bad Oil | Change oil | 23 | History |
| Silencer (New) | Zone-1:Pump No-4 | 17-Nov-2014 06:25:43 | Underfilled | Check oil leak | 23 | History |
| Silencer (New) | Zone-1:Pump No-4 | 20-Nov-2014 06:25:43 | Abusive Operation | Decrease Pressure | NA | History |
| Silencer (New) | Zone-1:Pump No-3 | 23-Nov-2014 06:25:43 | Bearing Anamoly | Cheak Bearing | NA | History |
| Silencer (New) | Zone-1:Pump No-3 | 03-Dec-2014 06:25:43 | Overfilled | Decrease oil level | N/A | History |
| Silencer (New) | Zone-1:Pump No-2 | 09-Dec-2014 06:25:43 | Anamoly Tension | Check Conveyer Tension | N/A | History |
| Silencer (New) | Zone-1:Pump No-2 | 10-Dec-2014 06:25:43 | Underfilled | Check oil level | 23 | History |
| Silencer (New) | Zone-1:Pump No-2 | 15-Dec-2014 06:25:43 | Bad Oil | Change oil | Red | History |

FIG. 9

INTERNET OF THINGS BASED DETERMINATION OF MACHINE RELIABILITY AND AUTOMATED MAINTAINENACE, REPAIR AND OPERATION (MRO) LOGS

CROSS-REFERENCE TO RELATED APPLICATION

This application is a Continuation in Part of U.S. patent application Ser. No. 14/628,322 filed Feb. 23, 2015, entitled "Real Time Machine Learning Based Predictive and Preventive Maintenance of Vacuum Pump", owned by the assignees of the present application and herein incorporated by reference in its entirety.

FIELD OF TECHNOLOGY

The present invention generally relates to Internet of Things (IOT), and more particularly relates to an IOT-based system and method for determining machine reliability.

BACKGROUND

Internet of Things (IOT) is a network of uniquely-identifiable and purposed "things" that are enabled to communicate data over a communications network without requiring human-to-human or human-to-computer interaction. The "thing" in the "Internet of Things" may virtually be anything that fits into a common purpose thereof. For example, a "thing" could be a person with a heart rate monitor implant, a farm animal with a biochip transponder, an automobile comprising built-in sensors configured to alert its driver when the tire pressure is low, or the like, or any other natural or man-made entity that can be assigned with a unique IP address and provided with the ability to transfer data over a network. Notably, if all the entities in an IOT are machines, then the IOT is referred to as a Machine to Machine (M2M) IOT or simply, as M2M IOT.

It is apparent from the aforementioned examples that an entity becomes a "thing" of an M2M IOT especially, when the entity is attached with one or more sensors capable of capturing one or more types of data pertaining to: segregation of the data (if applicable); selective communication of each segregation of data to one or more fellow "things"; reception of one or more control commands (or instructions) from one or more fellow "things" wherein, the control commands are based on the data received by the one or more fellow "things"; and execution of the commands resulting in manipulation or "management" of an operation of the corresponding entity. Therefore, in an IOT-enabled system, the "things" basically manage themselves without any human intervention, thus drastically improving the efficiency thereof.

In the prior art, some patents disclose systems and methods for predictive or preventive maintenance of machines based on sensor data analytics. For example, U.S. Pat. No. 8,571,904 B2 describes regarding optimization of control systems for networked industrial sensors and associated methods primarily in an industrial automation environment. The invention provides self-sensing and/or communication with sensors, and integration of control methods and strategies to optimize performance and operational objectives.

U.S. Pat. No. 8,126,574 B2 relates to control system and methods for selecting, controlling and optimizing utilization of machinery primarily in an industrial automation environment. The invention employs machine diagnostic and/or prognostic information for optimizing an overall business operation.

U.S. Pat. No. 7,406,399 B2 describes system and method for obtaining and analyzing data from one or more discrete machines, automatically determining relationships related to the data, taking corrective action to improve machine operation and/or maintenance, automatically and heuristically predicting a failure associated with the machine and/or recommending preventive maintenance in advance of the failure, and/or automating and analyzing mining shovels.

U.S. Pat. No. 8,112,381 B2 relates to improved techniques for early fault detection via condition-based maintenance (CBM) and predictive maintenance (PM) using a wireless sensor network to gather data from a large number of sensors.

WO 2014044906 A1 describes predictive maintenance method of hoisting equipment, particularly a crane, the method comprising the steps of: automatically collecting, at a maintenance center, diagnostic data relating to a component of a remote hoisting equipment and optionally sensor data relating the operational environment of the remote hoisting equipment; providing configuration data of the remote hoisting equipment; providing reliability data on said at least one component of the remote hoisting equipment; automatically generating, based on said diagnostic data, configuration data, reliability data and optionally on said operational environment data, a maintenance plan optimizing the cost of maintenance and reliability of the hoisting equipment over a life cycle of the hoisting equipment.

It is evident from the above discussion of the aforementioned prior art that none of them discloses or suggests determination of machine reliability based on a scalable IOT system. The aforementioned prior fail to show or suggest scalable tools for managing and analyzing the collected sensor data and mobile middleware solutions to shuffle and map the data for a Big Data layer. Therefore, there is a need in the art for a solution to the aforementioned problem which addresses the data volume and speed scalability along with a complexity of mapping the data for analytical purposes.

SUMMARY

A computer implemented method for determining reliability of a machine includes the step of receiving one of a machine operational condition data, machine historical operational data and machine specific information data from one or more location through an internet of things (IOT) based machine wearable sensor network. The method further includes storing the data in a distributed computer database communicatively coupled to an enterprise resource planning (ERP) system and extracting through a computer server, one or more entity information from the data to compare against a pre-defined baseline. Further, mapping through a big data machine learning engine, the extracted entity information into a multi-classification model. The mapping includes classifying the data into a root cause analysis engine, mapping the data into one or more levels and analyzing the mapped entity information through a real-time data feed platform associated with a distributed real-time computation system. The method further includes indicating, through a machine learning engine coupled to a predictive analytics engine, on a user interface, a set of analytical predictions for machine maintenance, repair and operation.

In an embodiment, the analytical predictions indicated on the user interface may comprise a color scheme including red, yellow and green.

A real-time IOT based system for determination of machine reliability includes the following components: one or more machine wearable sensors associated with a communications network, an internet of things (IOT) sensor network communicatively coupled to the communications network, an ERP system communicatively coupled to a distributed database over the communications network, a real-time data feed platform associated with a distributed real-time computation system communicatively coupled to the internet of things (IOT) sensor network over the communications network and a big data machine learning engine coupled to a predictive analytics engine over the communications network. One or more of the machine operational condition data, machine historical operational data and machine specific information data from one or more locations is received through an internet of things (IOT) sensor network. The data is stored in a distributed computer database communicatively coupled to an enterprise resource planning (ERP) system. One or more entity information is extracted from the data to compare against a pre-defined baseline. One or more entity information is mapped onto a multi-classification model. The mapping includes one or more of: classifying the data into a root cause analysis engine, and mapping the data into one or more levels. The data is analyzed, through a real-time data feed platform associated with a distributed real-time computation system. A set of analytical predictions for machine maintenance is indicated, through a machine learning engine coupled to a predictive analytics engine, on a user interface for one or more of a repair and operation of the machine.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated in a non-limiting but in a way of example, in the figures of the accompanying drawings, in which like reference characters indicate similar elements and in which:

FIG. 9 is an exemplary view of maintenance and operations data, according to one embodiment.

Figure 1A:
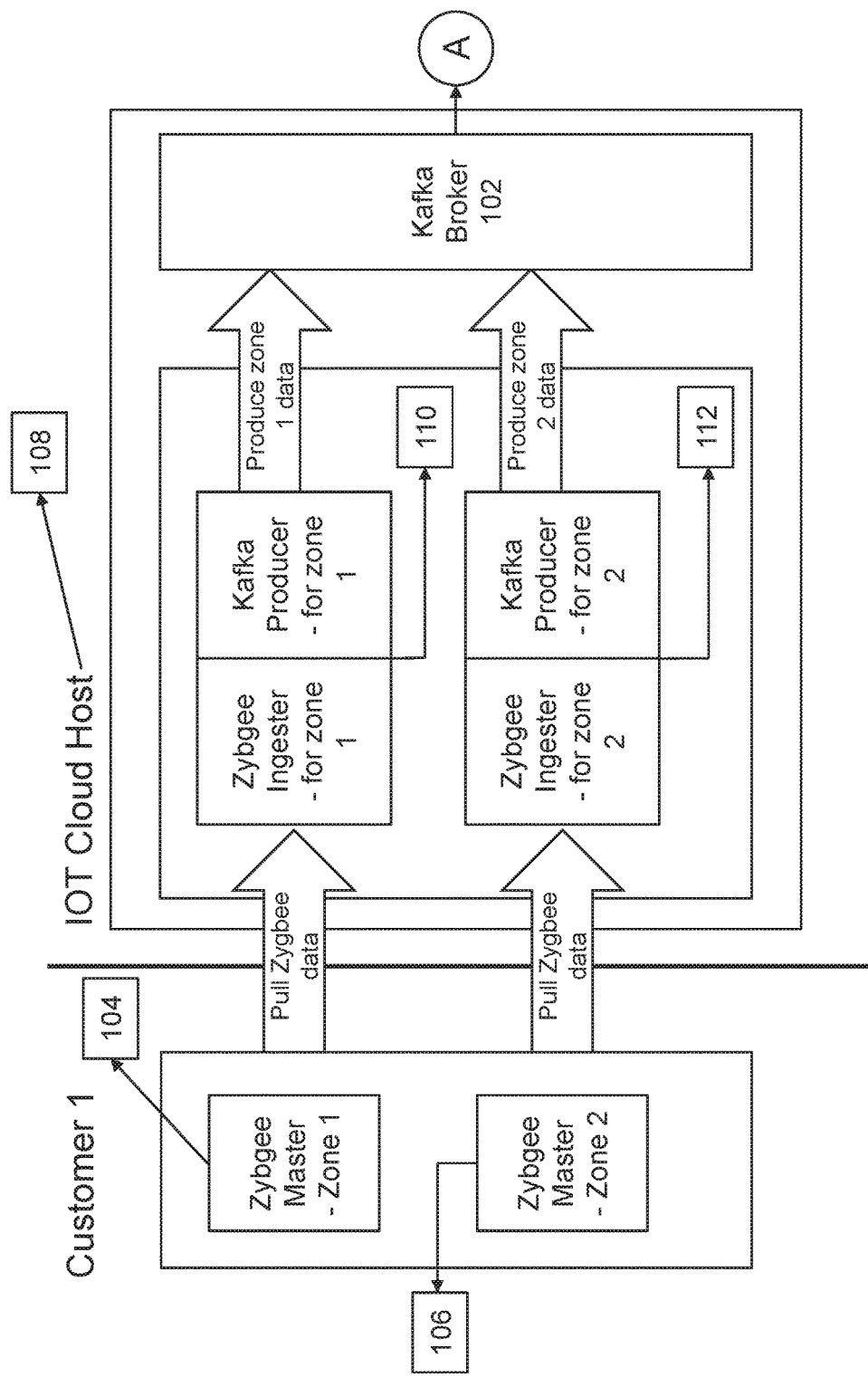
FIG. 1A, is a diagrammatic representation of one half of an IOT application architecture, according to one or more embodiments.

Other features of the present embodiments will be apparent from the accompanying drawings and from the detailed description that follows.

DETAILED DESCRIPTION

Example embodiments, as described below, may be used to provide a method, an apparatus and/or a system of internet of things based determination of machine reliability. Although the present embodiments have been described with reference to specific exemplary embodiments, it will be evident that various modifications and changes may be made to these embodiments without departing from the broader spirit and scope of the invention.

Aforementioned prior arts in the background section, fail to disclose beyond a simple rule engine. Rule engines may be algebraic relations of sensor data to predictive maintenance states. Rule engines may be restrictive and limited in applicability. Predictive maintenance (PM) states may be derived from multiple sets of data such as vibration, temperature etc. Raw data may not be indicative of any rule. Thereby leaving the rule engine not applicable.

Data such as vibration, temperature etc., may be unstructured to a large extent. Unstructured data may not allow applicability of rules till a physics based transformation is applied to the unstructured data.

Further, determination of predictive maintenance (PM) states may involve multiple data such as temperature, vibration etc. A clustered vector classification based on supervised machine learning may be applied to the multiple datasets comprising of multiple parameters, as opposed to a simple rule engine over structured data, to determine an accurate PM state.

Still further, supervised learning may include multiple steps. Multiple steps may include auto-baselining.

In one or more embodiments, auto-baselining may be collection of data when a machine is perfect without any service issue. Auto-baselining may be needed for comparing the machine in perfect running condition with datasets of a another or same machine with service issues. Auto-baselining may not be needed for a simple rule engine as published in the prior arts involving rule engine.

Aforementioned prior arts fail to address any scalability concerns. Scalability may become a concern when multiple sensors at multiple locations are continuously transmitting data to a central location for processing. Aforementioned arts also fails to suggest the use of big data analytics for analyzing the volumes of data. Big data analytics may help in analyzing high volume and high speed data. In an example embodiment, the high volume and high speed analytics may be achieved through a combination of Apache Kafka, Apache Cassandra™ and Apache Spark™.

In one or more embodiments, an IOT application may receive data from different machine mounted sensors. The IOT application may apply physics based and/or statistical models along with machine learning algorithms to predict a multiple criteria of a machine such as current machine state, failure cause and number of days left for the machine to go bad. The predicted multiple criteria may aid in predictive maintenance and also planning maintenance logistics for the machine.

Predictive maintenance (PM) of the machine may include sensors and sensor networks. Machine mounted sensors and/or machine wearable sensors may be enabled with either a BLE and/or Zigbee communication protocol. The BLE and/or Zigbee enabled sensor network may push data via a mobile application to an OLAP (Online analytical processing) software deployed on cloud.

In one or more embodiments, in each factory zone, one mobile application may be deployed on a mobile platform to receive data from sensors and the data is forwarded to a cloud based server software.

In an example embodiment, a cloud based server application may receive data from a mobile communication application including data such as identified machine state (On/Off). If a machine is off, the server application instructs not to process the data other than auto calibration of sensor. Further, the cloud based server application may receive data relevant to auto calibration of machine wearable sensors initiated by the mobile application. The server application may get a request and if a machine is in off state, the server application may send a command to the mobile application to initiate auto-calibration of sensors. The auto-calibration data may be stored for each sensor.

In one or more embodiments, auto calibration may include an operation that, under specified conditions, in a first step, establishes a relation between a quantity values with measurement uncertainties provided by measurement standards and corresponding indications with associated measurement uncertainties (of a calibrated instrument and/or secondary standard) and, in a second step, the operation uses the first step to establish a relation for obtaining a measurement result from an indication.

The server application may provide a facility to baseline the sensor data. The baseline may be used to run analytics on each machine. Thus, each machine's data may be baselined which is to maintain a sensor database for an idealized PM state which is designated as free from any machine or maintenance issue. The baselining process may be started by a user. The server application may process sensor data. The server application may need to receive, analyze sensor data, raise alarms when issues happen, store raw sensor data and store processed data with issues. The server application may calculate "days to red", issue count, power consumption, machine downtime and/or uptime, life span etc. The server application may store analytics information and provide rest of the services to access data from mobile app as shown in FIG. 1B.

In one or more embodiments, physics based entity extraction from sensor data may involve a multi-step process. The sensor data may be obtained from machine wearable sensors placed on vacuum pumps. The vacuum pumps may be in various geographical locations. The multi-step process may be an analytic process in one more layers. In one layer, Physics based entity extraction may be achieved to compare against a pre-defined baseline to detect failure. In another layer, the physics based entity extraction may be mapped to a multi-classification model. The mapping may be achieved through a big data based machine learning model.

Further, the multi-classification model may classify one or more of vibration, magnetic field, power factor, temporary data, etc. into a root cause analysis such as oil leak, oil state (viscosity), filter clogging, unsafe operation, bearing anomaly etc.

Furthermore, the mapping may be into a multi-level classification. In one or more embodiments, the number of levels may be three levels such as Red, Yellow and Green. The number of levels may be associated with a normalized scale of hundred (100), where zero to sixty (0-60) indicated by Green color may refer to a well maintained state, sixty to eighty (60-80) indicated by Yellow color may refer to a poorly maintained state and eighty to hundred (80-100) indicated by Red color may refer to a state harmful to a machine where the machine wearable sensor sending a data is placed. A time interval may be defined to obtain new data from machine wearable sensors.

In an example embodiment, the mapping into multiple levels may be repeated every one hour for a predictive maintenance issue, such as oil state. A system may track movement of the predictive maintenance issue towards a Red or a Yellow indicator status, when an update is received at the end of the time interval. The system may track the movement through a big data analytics server.

In one or more embodiments, after the update of the predictive maintenance issue after a time interval, a set of non-linear and/or liner regression equations may be generated. The set of non-linear and/or liner regression equations may be generated based on data collected over time. Thus, a calculation of number of days to read Red or Yellow may be estimated. In another layer of analytic processing, a result of a calculation of number of days to Red may be indicated.

Figure 1B:
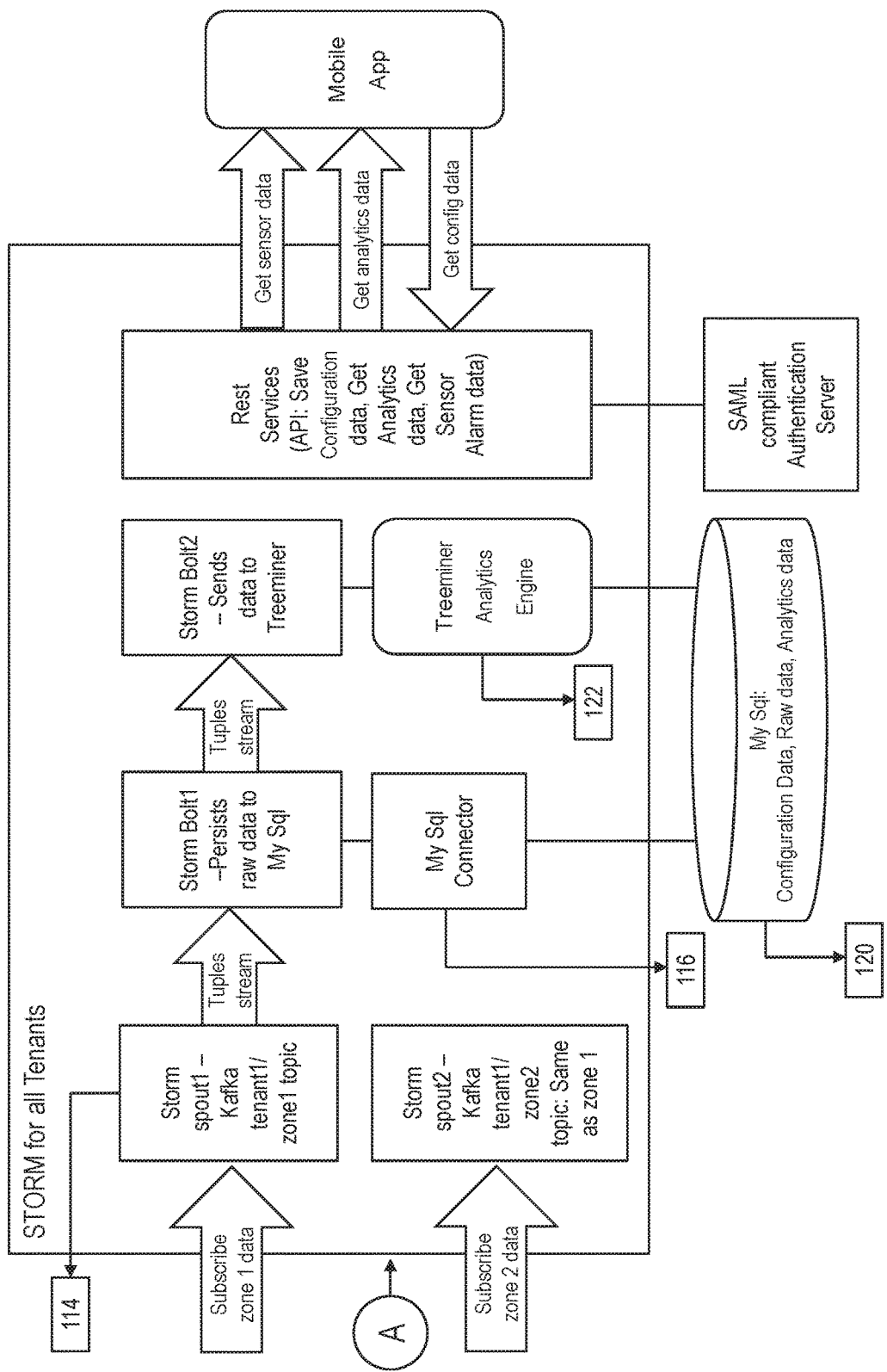
FIG. 1B is a diagrammatic representation of another half of an IOT application architecture, according to one or more embodiments.

FIG. 1A, is a partial view of an IOT application architecture, according to one or more embodiments. FIG. 1A and FIG. 1B when combined form a diagrammatic representation of an IOT application architecture. FIG. 1A includes two major portions including a customer and an IOT cloud host 108. Zigbee master for zone 1, 104 and zigbee master for zone 2, 106 may provide data to a zigbee ingestor for zone 1 that is associated with a kafka producer for zone 1, 110 and a zigbee ingestor for zone 2 that is associated with a kafka producer for zone 2, 112. 110 and 112 may produce data for kafka broker 102.

Figure 13:
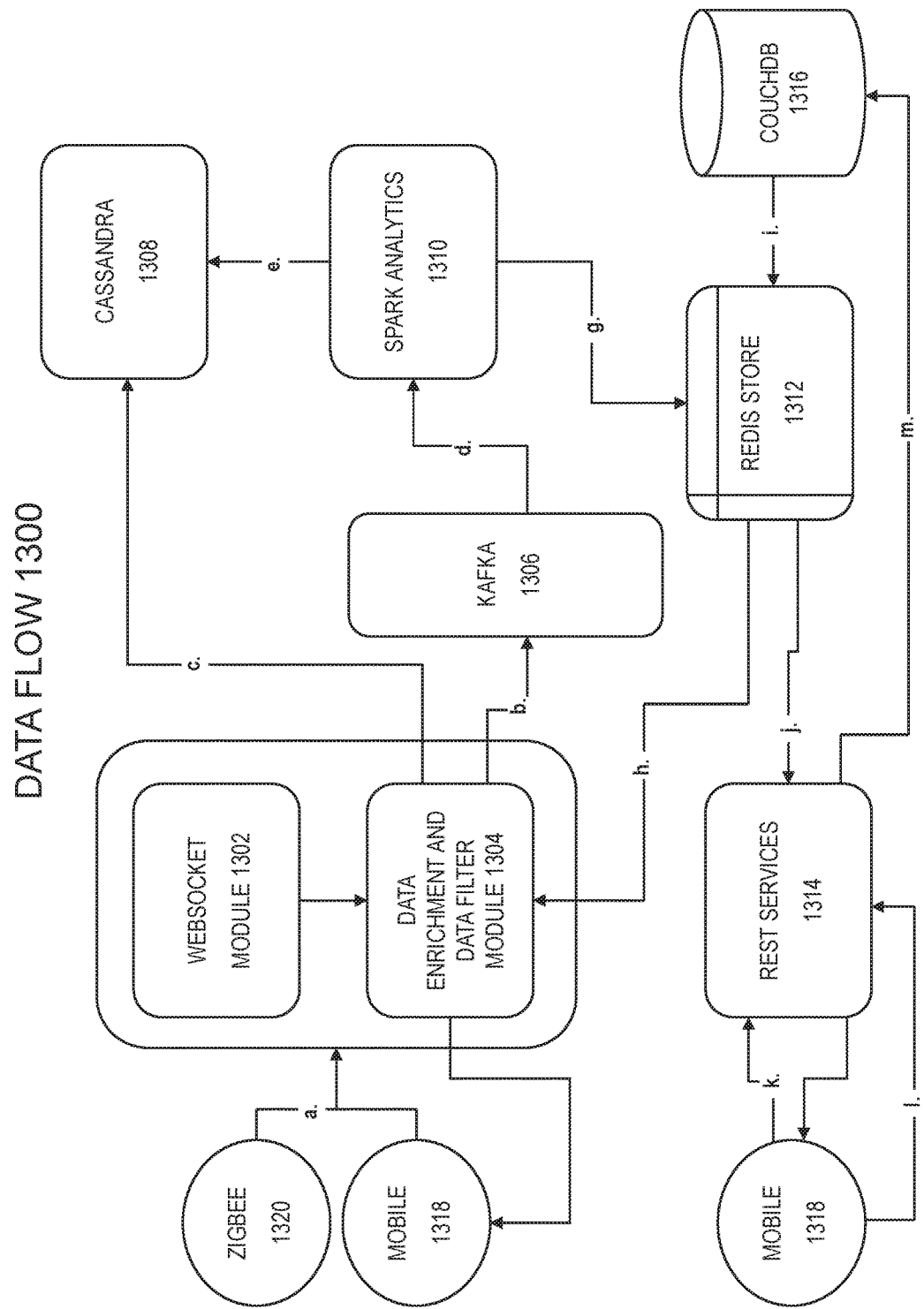
FIG. 13 is a data flow diagram, according to one embodiment.

FIG. 1B, is a diagrammatic representation of another half of an IOT application architecture, according to one or more embodiments. The Kafka broker 102 may provide data to a Storm system through storm spout 114. In one or more embodiments, the storm system may be a distributed real-time computation system and renders it easy to reliably process unbounded streams of data. The storm spout 114 may be a kafka tenant. The storm spout 114 may provide data to as a tuples stream to a storm bolt. The storm bolt may send data to one or more of a data base connector such as MySql connector 116 and second storm bolt. The second storm bolt may provide the tuples stream to a treeminer analytics engine 122. The MySql connector 116 may save data onto a MySql database 120. Further, a mobile application installed on a mobile device may get access to sensor data, and/or analytics data and be able to save configuration data onto the storm system through an API. FIG. 13 provides another implementation view of the software system. Storm may be replaced by Apache Spark for analytics.

In one or more embodiments, configuration data may be stored in document oriented databases like MongoDB and/or CouchDB. Real time sensor data and analytics data may be stored in key and/or value databases like Cassandra.

Figure 2:
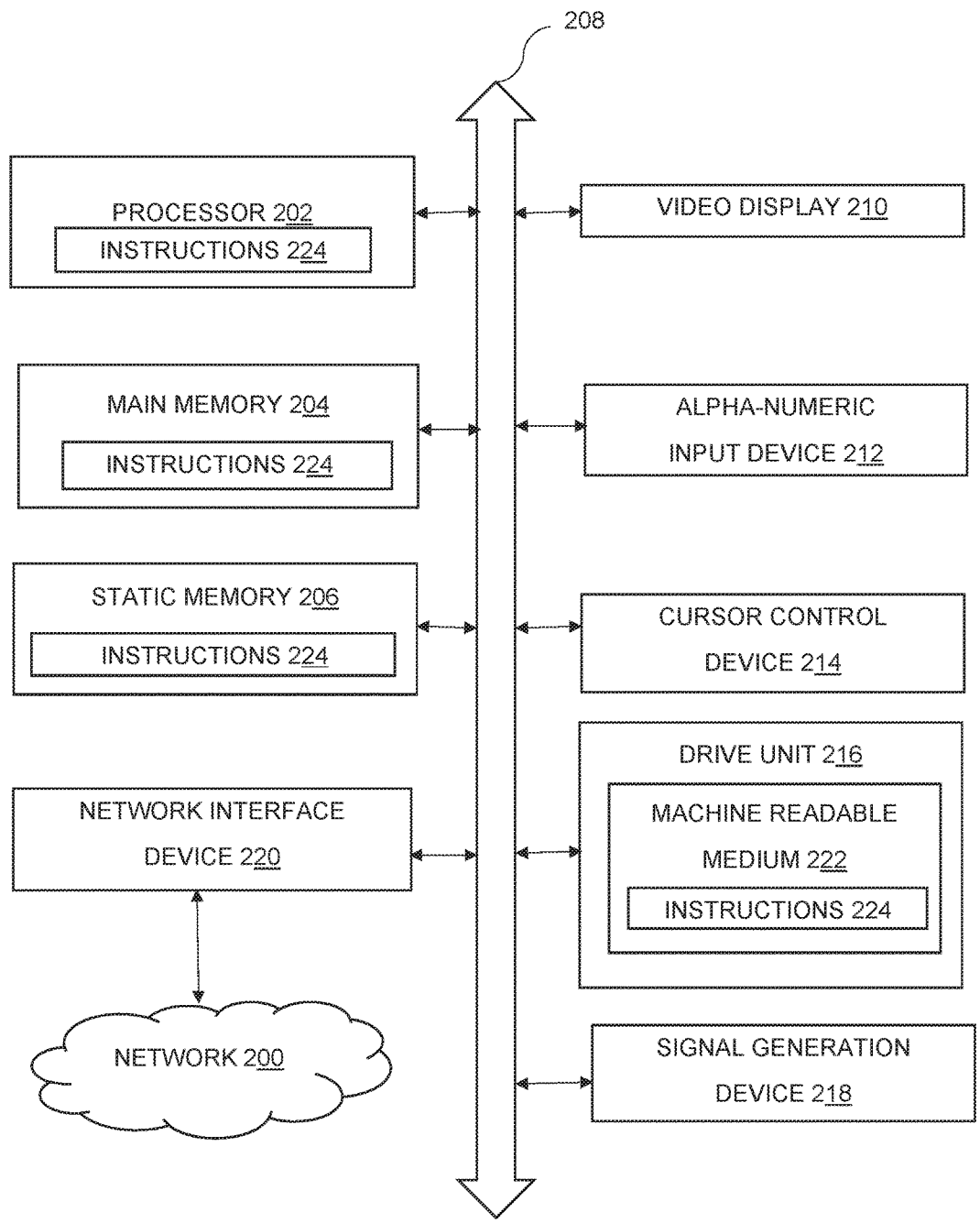
FIG. 2 is a diagrammatic representation of a data processing system capable of processing a set of instructions to perform any one or more of the methodologies herein, according to one embodiment

FIG. 2 is a diagrammatic representation of a data processing system capable of processing a set of instructions to perform any one or more of the methodologies described herein. FIG. 2 shows a diagrammatic representation of a machine in the exemplary form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or as a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The exemplary computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 further includes a machine-readable medium 222 on which one or more sets of instructions 224 (e.g., software) embodying any one or more of the methodologies and/or functions described herein is stored. The instructions 224 may also reside, completely and/or at least partially, within the main memory 204 and/or within the processor 202 during execution thereof by the computer system 200. The main memory 204 and the processor 202 also constituting machine-readable media.

The instructions 224 may further be transmitted and/or received over a network 226 via the network interface device 220. While the machine-readable medium 222 is shown in an exemplary embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that causes the machine to perform any one or more of the methodologies of the various embodiments. The term "machine-readable medium" shall accordingly be taken to include, but not be limited to, solid-state memories, optical and magnetic media, and carrier wave signals.

Figure 3:
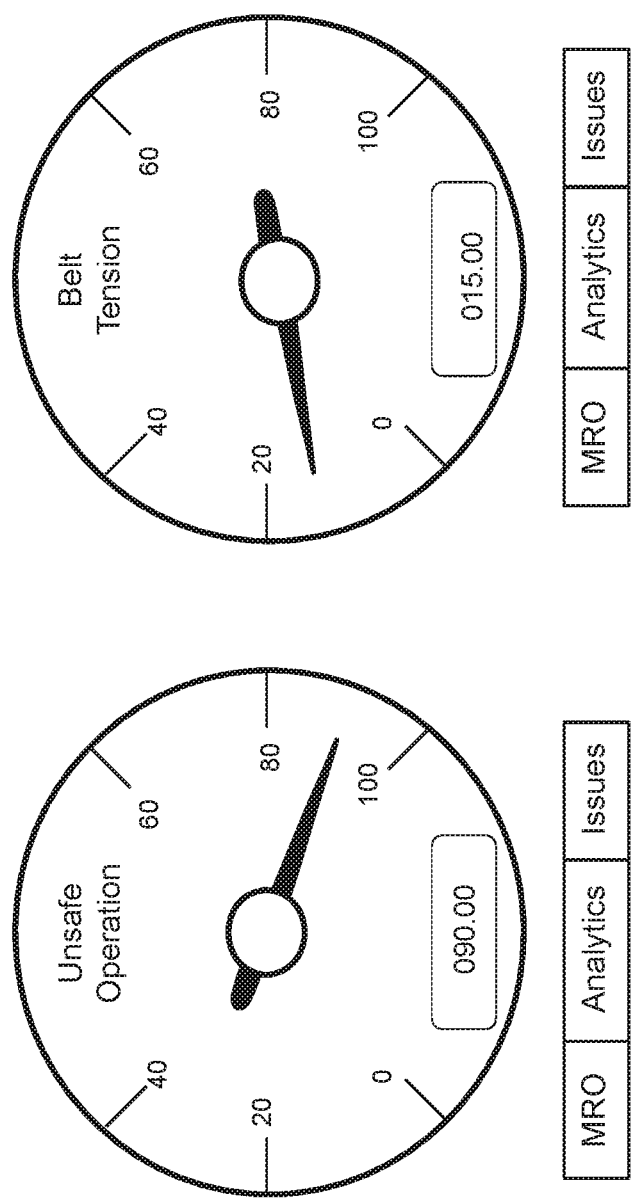
FIG. 3 is a snapshot of an application dashboard detailing, according to one or more embodiments.

FIG. 3 is a snapshot of an application dashboard detailing, according to one or more embodiments. A mobile application as depicted in FIG. 1B installed on a mobile device may get access to sensor data, analytics data and be able to save configuration data onto the storm system through an API. The mobile application may have an application dashboard, which may be a reflection of a machine health monitoring system. In one or more embodiments, a mobile application may have access to a dashboard, analytics, assets associated with a machine, status of various components in the machine, life cycle of a machine, plan details of machine, location of machine and other similar data. Dashboard may comprise normalized fuel gauge representation for display of health of sub-components, where fuel gauge dial reading are mapped from error distance of machine learning classification hyper planes. The method for determining machine reliability according to the present invention uses machine learning to do classification of machine health state and uses hyper planes in learning method to predict days to failure.

Figure 4:
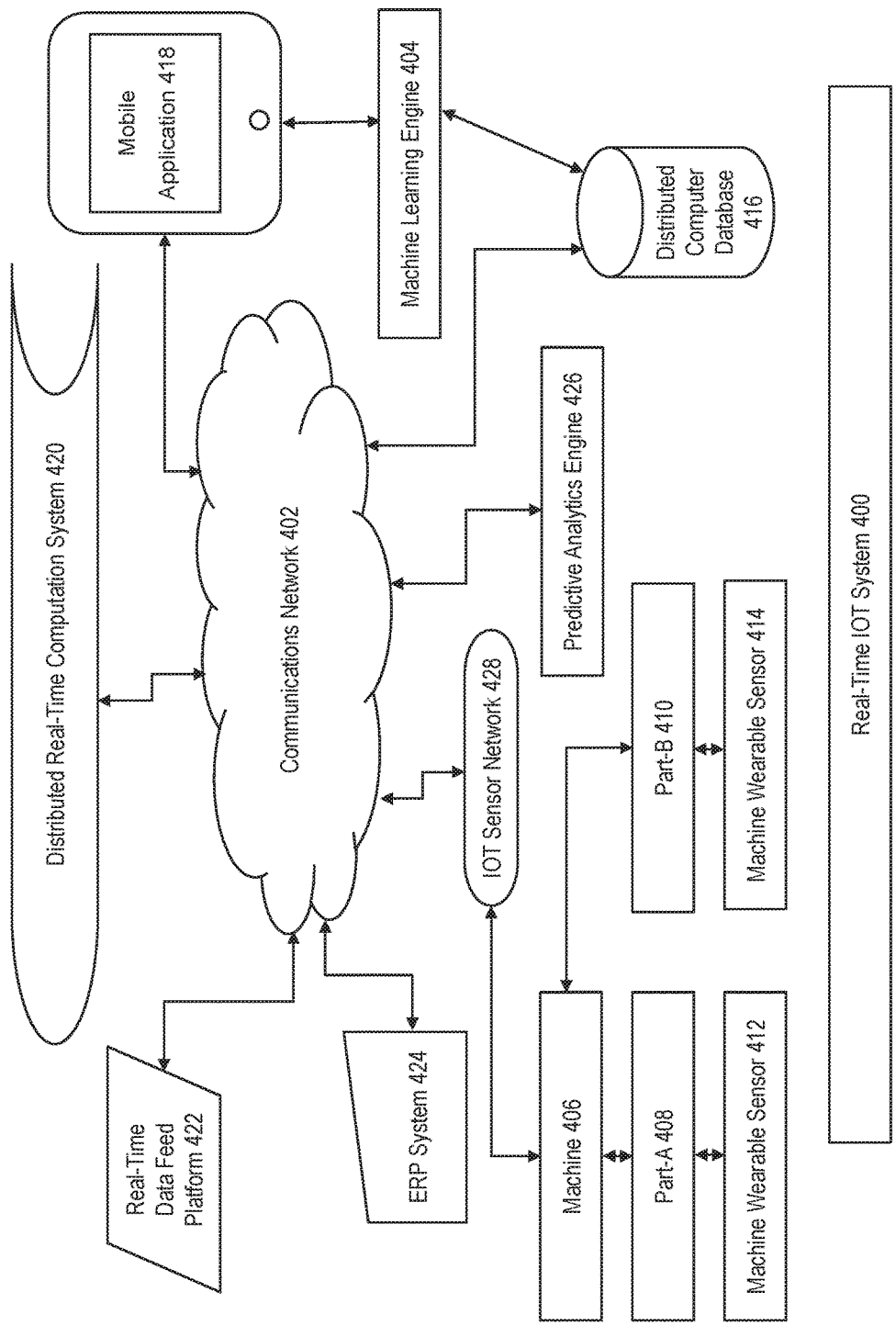
FIG. 4 is a diagrammatic representation of a real-time IOT system, according to one or more embodiments.

FIG. 4 is a schematic representation of a real-time IOT system 400, according to one or more embodiments. In one or more embodiments, the real-time IOT system 400 may include a communications network 402, machine learning engine 404, machine 406, part-A 408, part-B 410, machine wearable sensor 412, machine wearable sensor 414, distributed computer database 416, mobile application 418, distributed real-time computation system 420, real-time data feed platform 422, ERP system 424, predictive analytics engine 426, and IOT sensor network 428.

A real-time IOT system 400 for determination of machine reliability comprises one or more sensors associated with a communications network 402, an internet of things (IOT) sensor network 428 communicatively coupled to the communications network 402, an ERP system 424 communicatively coupled to a distributed computer database 416 over the communications network 402, a real-time data feed platform 422 associated with a distributed real-time computation system 420 communicatively coupled to the internet of things (IOT) sensor network 428 over the communications network 402, and a machine learning engine 404 coupled to a predictive analytics engine 426 over the communications network 402. One or more of machine operational condition data, machine historical operational data and machine specific information from one or more locations is received through an internet of things (IOT) sensor network 428. The one or more of machine operational condition data, machine historical operational data and machine specific information is stored in a distributed computer database 416 communicatively coupled to an enterprise resource planning (ERP) system 424. The one or more of machine operational condition data, machine historical operational data and machine specific information is analyzed, through a real-time data feed platform 422 associated with a distributed real-time computation system 420. A set of analytical predictions for machine maintenance is generated, through a machine learning engine 404 coupled to a predictive analytics engine 426, for one of a repair and operation of the machine.

In an embodiment, data collected from diverse locations such as 10,000 factory locations for 3P maintenance by using a combination of Cassandra (distributed database) and Storm or Spark real time to process the data in real time Big Data architecture and implemented using a broker system such as Kafka for storing the alarms as buffer database and then using Cassandra like distributed database for MRO system.

The real-time IOT system proposes a prescriptive, preventative and predictive maintenance possibility for a machine. Big data methodologies may be employed to analyze data obtained from various locations through the IOT sensor network 428. Big data may be used to describe a massive volume of both structured and unstructured data. Large volumes of data may be difficult to process using a traditional database and traditional software techniques. Therefore, a distributed real-time computation system 420 such as Apache Storm may be used.

In one or more embodiments, the real-time IOT system 400, may use predictive analytics and machine learning based classification. Further, a database of baseline features from sensor data and physics based modeling may be used by the real-time IOT system 400.

Figure 5:
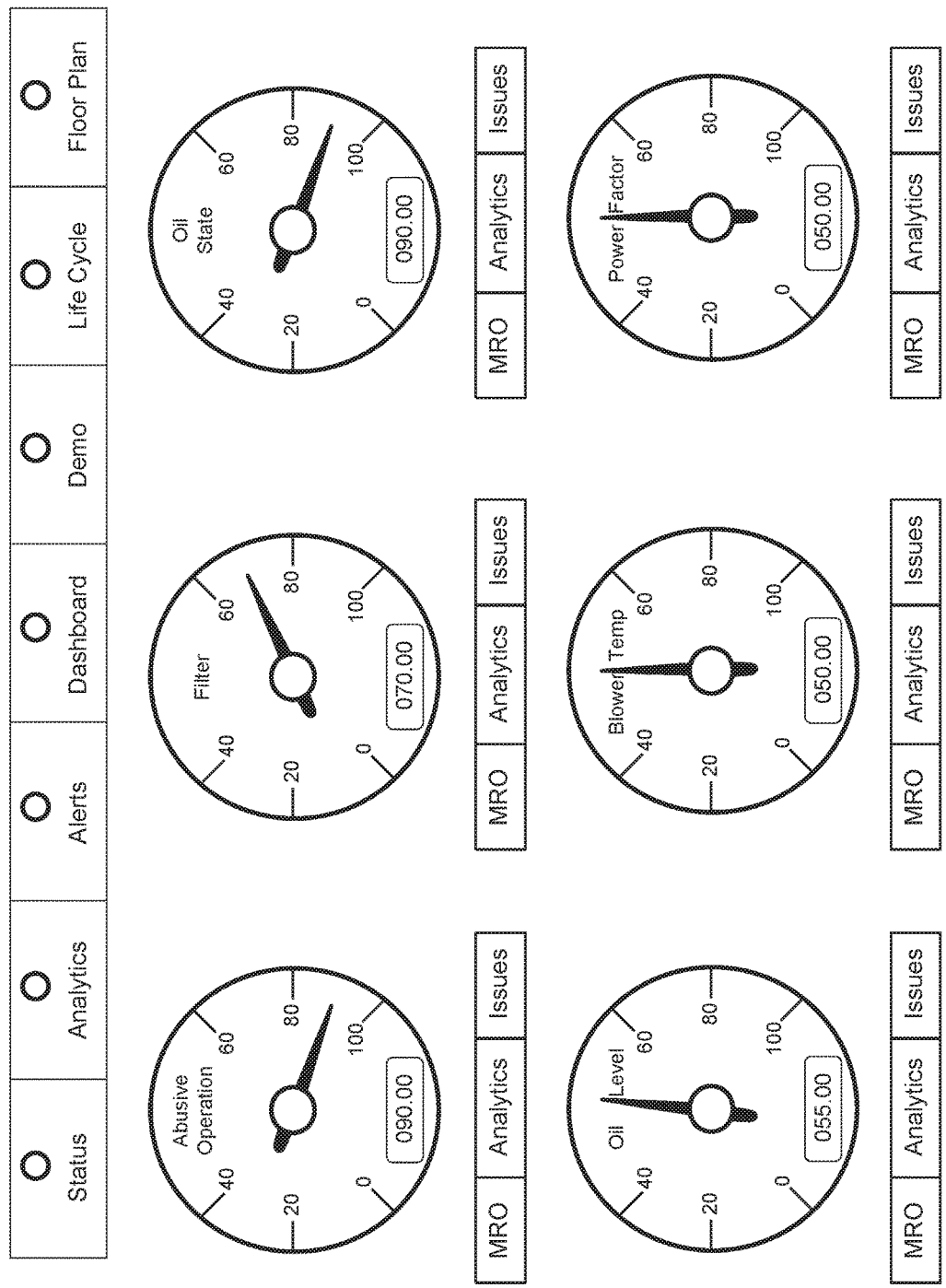
FIG. 5 is a diagrammatic representation of an application dashboard, according to one embodiment.

FIG. 5 is a diagrammatic representation of an application dashboard, according to one embodiment. In an example embodiment, the application dashboard may indicate various gauges such as abusive operation, filter alarm, oil state, oil level, blower temperature, power factor etc.

Figure 6:
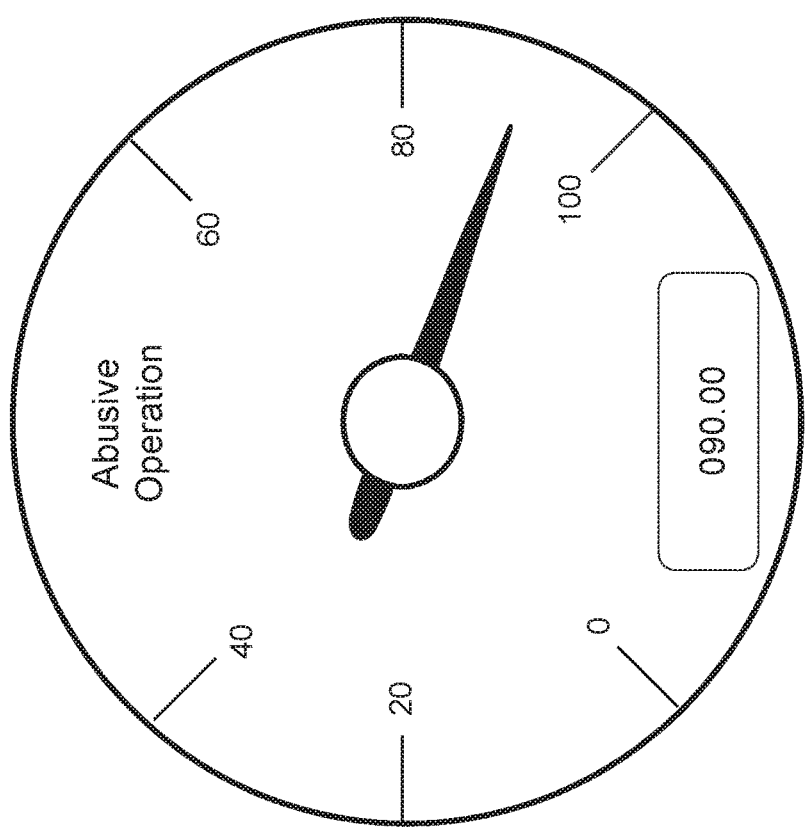
FIG. 6 is a diagrammatic representation of a fuel gauge to depict a predictive maintenance state, according to one example embodiment.

FIG. 6 is a diagrammatic representation of a fuel gauge to depict a predictive maintenance state, according to one example embodiment.

Figure 7:
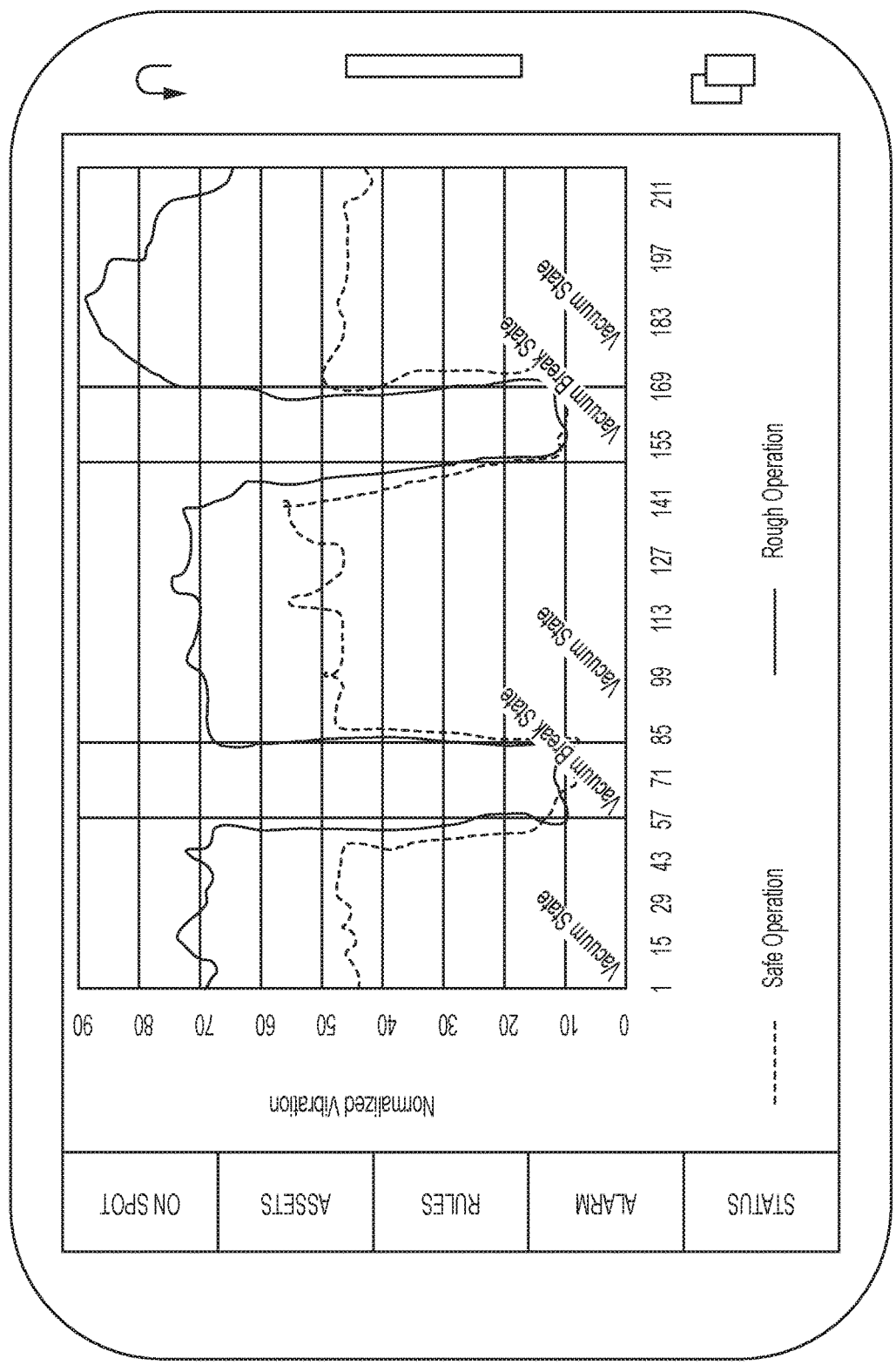
FIG. 7 is a representation of a mobile application tracking abusive operations for preventive maintenance so that pumps may last longer from real time vibration data, according to one embodiment.

FIG. 7 is a representation of a mobile application tracking abusive operations for preventive maintenance so that pumps may last longer from real time vibration data, according to one embodiment.

Figure 8:
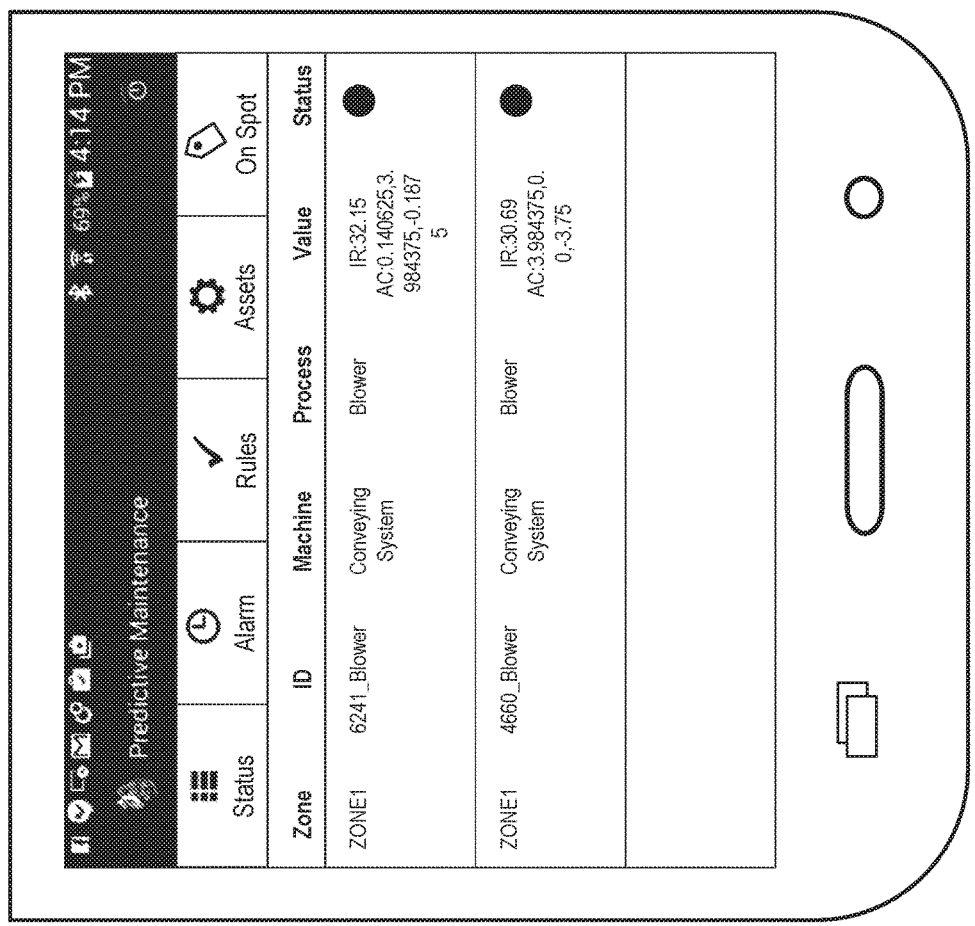
FIG. 8 is a representation of a real time status of a vacuum pump as seen on a mobile application, according to one embodiment.

FIG. 8 is a representation of a real time status of a vacuum pump as seen on a mobile application, according to one embodiment.

FIG. 9 is a view of maintenance and operations data, according to one embodiment.

Figure 10:
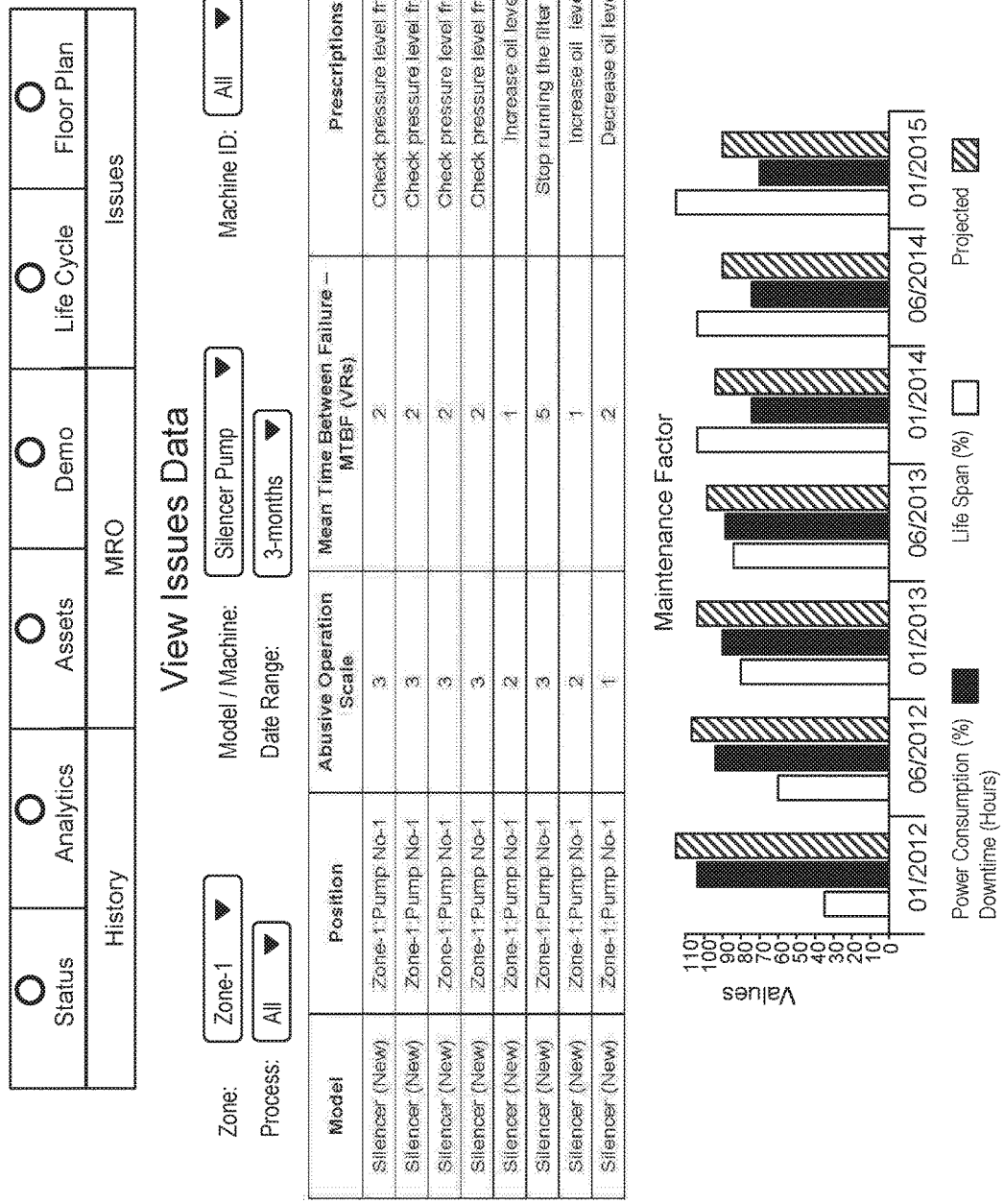
FIG. 10 is a view of issues data, according to one embodiment.

FIG. 10 is a view of issues data, according to one embodiment. Further, issues data may also include a depiction of maintenance factors.

Figure 11:
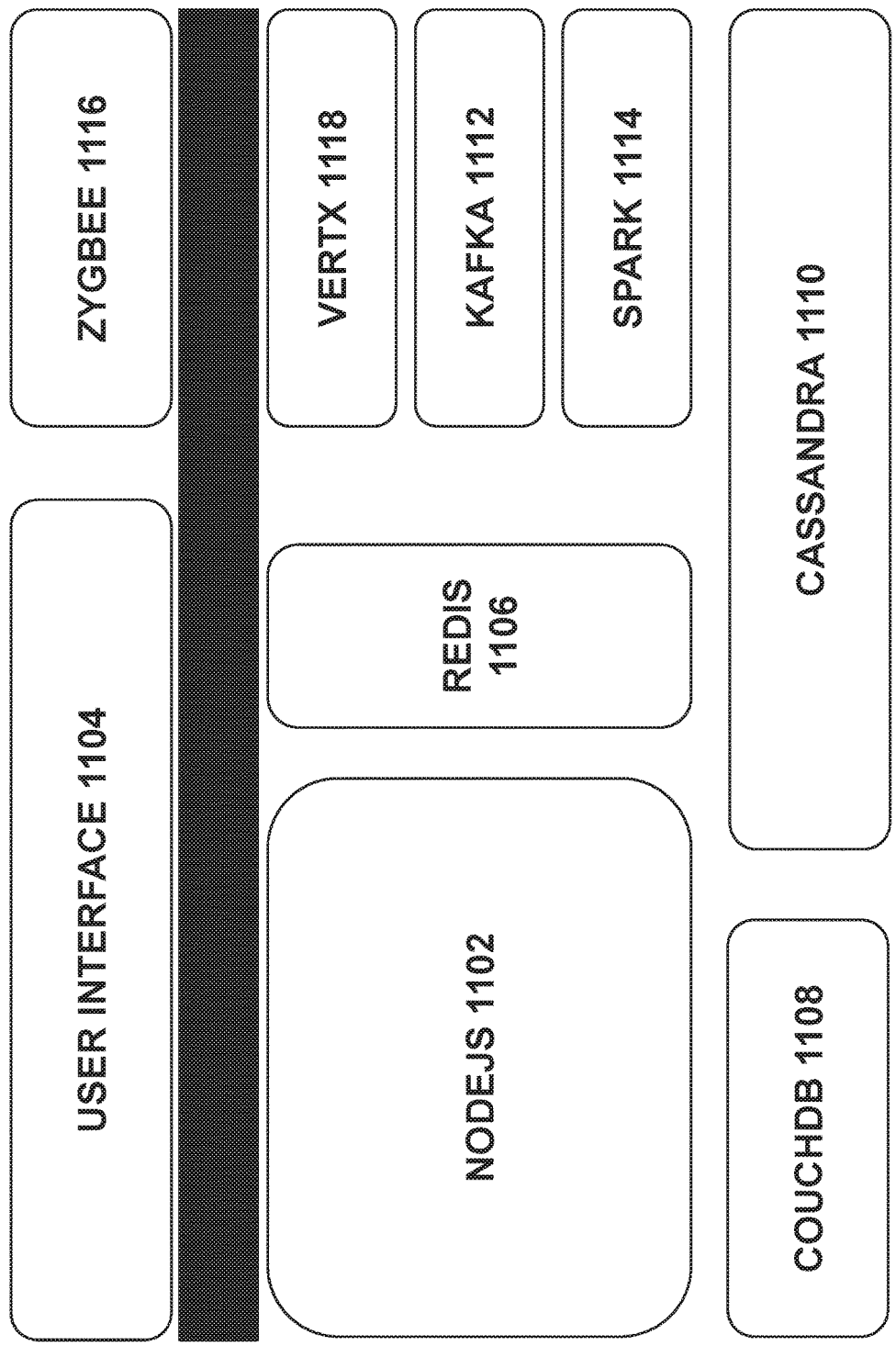
FIG. 11 is a component diagram, according to one example embodiment.

FIG. 11 is a component diagram, according to one example embodiment. The component diagram may include components utilized to determine machine reliability. Various component may include a NodeJS 1102, user interface 1104, redis 1106, CouchDB 1108, Cassandra 1110, Spark 1114, kafka 1112, vertx 1118, and Zigbee 1116.

User interface 1104 may communicate with server rest services and websockets for real time data. NodeJS 1102 may be a server to host the rest services. NodeJS 1102 may be a platform for building fast and scalable network applications. Vertx 1118 may host websockets for receiving data from sensor network and also pushing real time statistics to user interface 1104. Kafka 1112 may be a distributed queue for sensor data, events to kick off batch processing and pushing data to user interface 1104. Spark 1114 may be an analytics and OLAP batch engine. Cassandra 1110 may be a data store for analytics and OLAP data. CouchDB 1108 may be a data store for static, configurational and non-transactional data. Redis 1106 may be an in-memory data store used for caching. Zigbee 1116 may push sensor data. Vertx 1118 may receive sensor data, filer data and raise events at kafka 1112.

Figure 12:
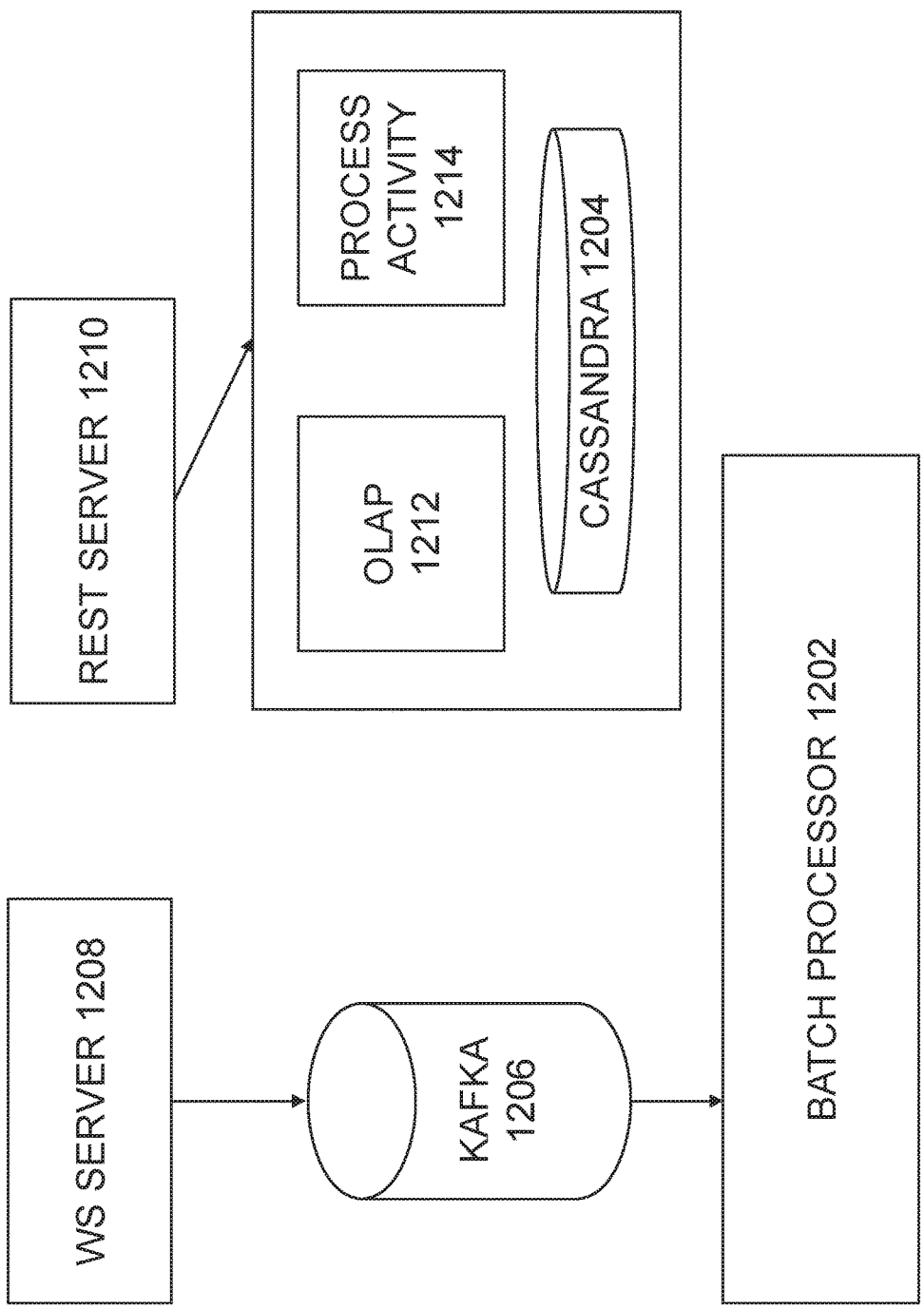
FIG. 12 is a back end architecture diagram, according to one embodiment.

FIG. 12 is a back end architecture diagram, according to one embodiment. In one or more embodiments, an architecture to determine reliability of a machine for PM may include a batch processor 1202, Cassandra 1204, kafka 1206, WS Server 1208, Rest server 1210, OLAP 1212, and Process activity module 1214.

FIG. 13 is a diagram depicting flow of data, according to one embodiment. Zigbee master 1320 or mobile application 1318 continuously pushes to Websocket Module 1302. Data enrichment and data filer module 1304 may receive data and read sensor metadata from Redis store 1312 and/or CouchDB 1316. Meta Data may be associated to a machine and/or zone for a machine wearable sensor. Kafka 1306 may determine if machine is in on or off state. If machine is in off state then Kafka 1306 may do nothing with the data. Else, Kafka 1306 may determine if overall system is in auto-baseline mode and/or real-time mode. (Mode may be set when front-end user starts baselining process).

In one or more embodiments, sensor data may be stored in Cassandra 1308. Data enrichment and data filter module 1304 may also determine based on the sensor information, if data is eligible for processing. If data is eligible, the data filter module 1304 may push a message to Kafka 1306.

Spark analytics 1310 may read from Kafka 1306 and based on batch size start a batch analysis once sufficient data is accumulated. Multi-level analytics may be stored in Cassandra 1308.

Redis store 1312 may cache latest data. Redis store 1312 may also store other static and non-transactional data from Mysql 1316.

Requests from mobile (both read and write) like add zone, add machine, associate machine with sensor and view MRO (maintenance, repair and operation) data, view analytics, view dashboard may be serviced by rest services 1314 module deployed in NodeJS.

In an example embodiment, a combination of stored learning signals and database from multiple factory location may be used by the real-time IOT system.

In an example embodiment, to support scalability of multiple factories, a brokering such as Kafka and a real-time distributed batch processing system such as Storm and/or Spark may be used. Use of a combination of a brokering system and a real-time distributed batch processing system may lead to faster batch processing of multiple parallel threads in distributed system.

In an example embodiment, the predictive analytics engine 426 may be used to determine: extra usage of electricity due to bad maintenance, decrease of life span of a machine, increase in down time, based on automated self-learning mechanism in machine learning.

In one or more embodiments, the communications network may include WiFi, 2G, 3G, 4G, GPRS, EDGE, Bluetooth, ZigBee, Piconet of BLE, Zwave, or a combination thereof. The machine learning architecture may be associated with a machine learning algorithm.

In an example embodiment, a computer implemented method for determining reliability of a machine, may include receiving one of the machine operational condition, machine historical operational and machine specific information data from at least one location through an internet of things (IOT) sensor network. The data may be stored in a distributed computer database communicatively coupled to an enterprise resource planning (ERP) system. The data may be analyzed through a real-time data feed platform associated with a distributed real-time computation system. A set of analytical predictions for machine maintenance, repair and operation may be generated through a machine learning engine coupled to a predictive analytics engine.

In one or more embodiments, sensor data associated with one of machine operational condition data, machine historical operational data and machine specific information may be received from one or more machine wearable sensors placed on a machine part.

In one or more embodiments, the internet of things (IOT) sensor network may be coupled to a communications network.

In one or more embodiments, communications network may comprise one of WiFi, 2G, 3G, 4G, GPRS, EDGE, Bluetooth, ZigBee, Piconet of BLE, Zwave, or a combination thereof, wherein a data collection unit is one of a mobile device and a wireless enabled device.

In one or more embodiments, based on the set of analytical predictions, one of a maintenance and a repair maybe scheduled for the machine.

In an embodiment, the maintenance and the repair is scheduled over the communications network through one of a notification on a mobile application, a Short message service (SMS), a telephone call, an email, or a combination thereof.

In an embodiment, analytical predictions include at least one of a prediction of machine failure, mean time between failure, additional usage of electrical power, downtime of a machine, and trends of various parts in a machine failure.

In one or more embodiments, sensor data may be received over a communications network onto a mobile application associated with a mobile device and an alarm may be raised over the communications network based on analytics through one of a notification on the mobile application, Short message service (SMS), a telephone call, email, or a combination thereof.

In one or more embodiments, a machine wearable sensor may be one of a MEMS or a single silicon sensor.

In an example embodiment, one or more entity information such as root mean square (RMS) of vibration data may be extracted from the data to compare against a pre-defined baseline.

In an example embodiment, the user interface may be associated with an application. The application may be associated with one of a mobile phone, television, kiosk, touch screen device, and a server.

In another example embodiment, an application may include a fuel gauge associated with color schemes such as red, yellow and green.

In an example embodiment, color scheme red may indicate a worst maintenance condition, yellow may indicate an intermediate condition and green may indicate a best maintenance condition. A parameter to decide worst maintenance and best maintenance condition may be received as input from a user of a machine that is associated with a machine wearable sensor.

In an example embodiment, an internet of things (IOT) sensor network may be coupled to a communications network. The communications network between a machine wearable sensor and a data collection unit may comprise one of WiFi, 2G, 3G, 4G, GPRS, EDGE, Bluetooth, ZigBee, Piconet of BLE, Zwave, or a combination thereof. The data collection unit may be one of a mobile device and a wireless enabled device.

In an example embodiment, data may be received through Industrial bus networks including one of a Canbus, Profibus, Controlnet, Worldfip, Interbus and Fieldbus.

In an example embodiment, a method of determining machine reliability may include scheduling, based on the set of analytical predictions, one of a maintenance, repair and operation start and/or end. Further, detection of any maintenance issue with suggestion for scheduling from predictive estimation of days left to turn the PM state into yellow or red from a green state may be determined based on the set analytical predictions.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A computer implemented method for determining reliability of a machine, comprising:
   a) receiving at least one of machine operational condition data, machine historical operational data and machine specific information data generated by at least one machine wearable sensor placed on a machine part from at least one location corresponding to said sensor through an internet of things based machine wearable sensor network;
   b) storing the data in a distributed computer database communicatively coupled to an enterprise resource planning system;
   c) extracting, through a computer server from the distributed computer database, the data for the machine to compare against a pre-defined baseline;
   d) using cluster vector classification mapping, through a big data machine learning engine, the extracted data into a multi-classification model to classify the data into a root cause analysis engine;
   e) using the root cause analysis engine mapping the data into one or more levels of predictive maintenance states associated with color schemes displayed as a gauge on a user interface of a mobile device, the color schemes including one of red, yellow and green where red indicates a bad maintenance condition, yellow indicates an intermediate maintenance condition, and green indicates a good maintenance condition;
   f) analyzing the data mapped in steps (d) and (e) through a real-time data feed platform associated with a distributed real-time computation system;
   g) determining reliability of the machine as defined by the results from making a set of analytical predictions for machine maintenance, repair and operation using the data analyzed in step (f) and the big data machine learning engine coupled to a predictive analytics engine;
   h) updating machine historical operation data with data received on the sensor network, through a real-time data feed platform associated with the distributed real-time computation system and indicating, through the big data machine learning engine coupled to a predictive analytics engine, on the user interface displayed on a hand-held portable electronic device having wireless internet access capabilities, the set of analytical predictions for machine maintenance, repair and operation, as produced in step (g) determining machine reliability; and i) performing sensor autocalibration.

2. The method of claim 1 wherein the internet of things sensor network is communicatively coupled to a communications network communicatively connected to a distributed computer database.

3. The method of claim 1 wherein the data is received through at least one industrial bus network.

4. The method of claim 1 further comprising scheduling, based on the set of analytical predictions, at least one of maintenance, repair and operation for the machine.

5. The method of claim 1 wherein at least one of maintenance and repair is scheduled over the communications network through notification on a mobile application, a telephone call, an email, or a combination thereof.

6. The method of claim 1, wherein the set of analytical predictions include at least one of a prediction of machine failure, mean time between failure, additional usage of electrical power and downtime of a machine.

7. A real-time industrial internet of things based system for determination of machine reliability and the root cause of ill health of the machine resulting from poor power quality, bad maintenance practice and abusive operations, comprising:

a) one or more machine wearable sensors for sensing vibration, current, and voltage, the sensors being operatively associated with a communications network;

b) the communications network including a data collection unit;

c) an enterprise resource planning system communicatively coupled to a distributed computer database over the communications network so that the distributed computer database can be utilized both from the cloud and a device communicating with the sensors via the communications network;

d) a real-time data feed platform associated with a distributed real-time computation system communicatively coupled to the sensors over the communications network; and e) a big data machine learning engine coupled to a predictive analytics engine over the communications network which learns about oil state, filter alarm, oil level, blower temperature, and power factor and abusive operation over the communications network;

wherein the at least one of machine operational condition data, machine historical operational data and machine specific information data from at least one sensor is received through the communications network;

wherein the data is stored in a distributed computer database communicatively coupled to the enterprise resource planning system;

wherein at least one entity information is extracted from the data through a computer server to compare against a database of baseline features from sensor data or a physics based model to extract machine health state from the data;

wherein the at least one entity information is mapped onto a multi-classification model;

wherein the mapping includes at least one of classifying the data into a root cause analysis engine, and mapping the data into one or more predictive maintenance states;

wherein the predictive maintenance states are associated with color schemes including red, yellow and green;

wherein the data is analyzed through a real-time data feed platform associated with a distributed real-time computation system; and wherein a set of analytical predictions defining machine reliability for machine maintenance is indicated, through a machine learning engine coupled to a predictive analytics engine, on a user interface for at least one of a repair, maintenance and operation of the machine.

8. The system of claim 7, wherein the sensor data collection unit is one of a mobile device or a wireless enabled device or a wired gateway device.

9. The system of claim 7, wherein based on the set of analytical predictions, scheduling is arranged for at least one of machine maintenance, repair and operation.

10. The system of claim 7, wherein the set of analytical predictions include at least one of machine failure, mean time between failure, additional usage of electrical power, and downtime of the machine.

11. The system of claim 7, wherein the set of analytical predictions include at least one of a prediction of machine failure, days to turn red for a particular predictive maintenance state, mean time between failure, additional usage of electrical power, and downtime of the machine.

12. The system of claim 7, wherein the predictive maintenance states are represented on the user interface through a graphical representation associated with color schemes to represent state for the machine conditions.

13. A computer implemented method for determining reliability of a machine comprising:

a) receiving machine operational condition data, machine historical operational data and machine specific information data generated by at least one machine wearable sensor operatively associated with a part of the machine, through an internet of things based machine wearable sensor network, each sensor sensing a physical parameter during machine operation;

b) storing the data in a distributed computer database communicatively coupled to an enterprise resource planning system;

c) using a big data machine learning engine for extracting data from the distributed computer database for comparison against a pre-defined baseline;

d) mapping, using the big data machine learning engine, the extracted data into a multi-classification model using clustered vector classification to classify the data into a root cause analysis engine, the mapping placing the data into levels of predictive maintenance state having associated red, yellow and green colors where red indicates a poor maintenance condition, yellow indicates an intermediate maintenance condition, and green indicates a good maintenance condition;

e) analyzing the mapped data, through a real-time data feed platform associated with a distributed real-time computation system and an operatively connected predictive analytics engine;

f) using the mapped data and the big data machine learning engine coupled to the predictive analytics engine, displaying on a mobile device user interface having visible fields of red, yellow, and green, a set of analytical predictions for machine maintenance, repair and operation defining reliability of the machine; and g) updating machine historical operation data with data received on the sensor network as used in performing step (f).

14. A computer implemented method for determining reliability of a machine comprising:

a) receiving machine operational condition data, machine historical operational data and machine specific information data generated by at least one machine wearable sensor operatively associated with a part of the machine, through an internet of things based machine wearable sensor network, each sensor sensing a physical parameter during machine operation;

b) storing the data in a distributed computer database communicatively coupled to an enterprise resource planning system;

c) using a big data machine learning engine for extracting data from the distributed computer database to compare against a pre-defined baseline;

d) using the big data machine learning engine, mapping the extracted data into a multi-classification model using clustered vector classification to classify the data into a root cause analysis engine, the mapping placing the data into levels of predictive maintenance state having associated red, yellow and green colors where red indicates a poor maintenance condition, yellow indicates an intermediate maintenance condition, and green indicates a good maintenance condition;

e) analyzing the mapped data, through a real-time data feed platform associated with the distributed real-time computation system and an operatively connected predictive analytics engine to create a set of analytical predictions for machine maintenance, repair, and operation;

f) using the mapped data and the big data machine learning engine coupled to the predictive analytics engine, displaying the set of analytical predictions for machine maintenance, repair and operating defining the reliability of the machine;

g) updating the machine historical operation data with data used in performing step (f); and h) performing sensor autocalibration using the data from step "f".

15. A real-time internet of things-based system for determining reliability of machines of interest as defined by analytic predictions of machine need for repair, maintenance and operation, comprising:

a) a plurality of machine wearable sensors operatively connected to machines of interest;

b) a communications network operatively connected to the sensors;

c) an internet of things sensor network communicatively coupled to the communications network and receiving machine operational condition data, machine historical operational data, and machine specific information data from the machine wearable sensors via the communications network;

d) an enterprise resource planning system communicatively coupled to the communications network;

e) a distributed database, connected to the enterprise resource planning system via the communications network, for storing machine operational condition data, machine historical operational data, and machine specific information data;

f) a real-time data feed platform communicatively coupled to the internet of things sensor network via the communications network;

g) a big data machine learning engine;

h) a predictive analytics engine coupled to the big data machine learning engine via the communications network;

i) a distributed real-time computation system, communicatively connected to the real-time data feed platform and to the enterprise resource planning system for storing the machine operational condition data, the machine historical operational data and the machine specific information data received from the sensors over the communications network and the internet of things sensor network;

with the machine operational condition data, machine historical operational data and machine specific information data from the machines of interest being received by the distributed database through the internet of things sensor network;

with the machine operational condition data, the machine historical operational data and the machine specific information data being stored in the distributed database communicatively coupled to the enterprise resource planning system, and the operational condition data, historical operation data, and specific information for at least one machine being extracted from the data to compare against a pre-defined baseline, with the extracted information being mapped into a supervised multi-classification machine learning model and being classified into a root cause analysis engine and into one or more predictive maintenance states associated with a color scheme including red, yellow and green;

wherein the extracted information is analyzed, through the real-time data feed platform associated with the distributed real-time computation system to create a set of analytical predictions for machine repair, maintenance; and wherein the set of analytical predictions for machine maintenance is indicated, through the big machine learning engine coupled to the predictive analytics engine, on a user interface for at least one of a repair, maintenance and operation, defining reliability of the machine.

* * * * *